Figures 1, 2:
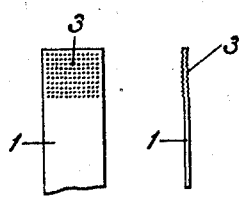

C. B. AUEL.
ELECTRIC WELDING PROCESS.
APPLICATION FILED DEC. 10, 1914.

1,229,700.

Patented June 12, 1917.

WITNESSES:
R. J. Fitzgerald
R. D. Brown

INVENTOR
Carl B. Auel.
BY
Wesley G. Carr
ATTORNEY

UNITED STATES PATENT OFFICE.

CARL B. AUEL, OF WILKINSBURG, PENNSYLVANIA, ASSIGNOR TO WESTINGHOUSE ELECTRIC AND MANUFACTURING COMPANY, A CORPORATION OF PENNSYLVANIA.

ELECTRIC WELDING PROCESS.

1,229,700. Specification of Letters Patent. Patented June 12, 1917.

Application filed December 10, 1914. Serial No. 876,483.

*To all whom it may concern:*

Be it known that I, CARL B. AUEL, a citizen of the United States, and a resident of Wilkinsburg, in the county of Allegheny and State of Pennsylvania, have invented a new and useful Improvement in Electric Welding Processes, of which the following is a specification.

My invention relates to welding processes and particularly to processes of electrically welding thin metallic sheets or ribbons, and it has for its object to provide a simple and effective process of incandescent electric welding for joining thin sheets and ribbons of metals which quickly tarnish in the air and which, therefore, become covered with a film or scale that seriously interferes with ordinary welding methods.

Thin metal sheets and ribbons may be easily welded together by ordinary processes of incandescent electric welding if their surfaces are clean. Certain pure metals and alloys, however, undergo very rapid surface oxidation, upon exposure to the air, and the resulting coating of oxid must be removed before such metals can be successfully welded. This is often a matter of great difficulty, especially when the oxid scale adheres closely to the metal, and also when the metal is in the form of thin sheets or ribbons, in which case vigorous rubbing with emery and similar abrasives is likely to remove a large portion of the metal along with the scale, and may even wear it through. I have found particular difficulty in so cleansing ribbons of nickel-chromium alloys which are now extensively used in making electric resistance elements, for the reason that the oxid scale on these alloys frequently cannot be removed by ordinary rubbing with emery paper, but an emery wheel or its equivalent must be used.

According to my present invention, I obviate these difficulties and make welded joints between the thinnest ribbons with ease and despatch by embossing the parts to be welded, just previous to welding, with a very large number of small points or projections set closely together over substantially the entire area to be welded, which break the scale and present clean points of electric contact. I find it convenient to perform the embossing operation with a pair of pliers, at least one of the jaws of which is closely studded with small projections. By squeezing the part to be welded with such pliers, the closely set points are forced into the thin metal and form corresponding projections on the opposite side of the metal. If the embossed surfaces are then placed together or upon other clean metallic surfaces, welding may be effected by the application of pressure and electric current in the ordinary manner.

Figure 3:
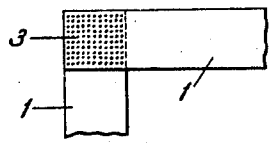
Figure 4:
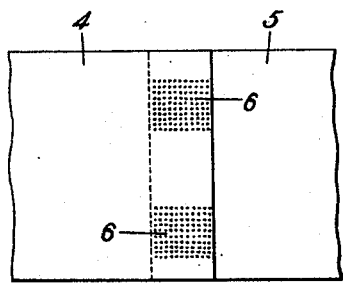
Figure 5:
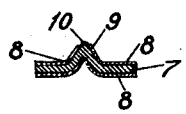

Certain methods of applying my invention are illustrated in the accompanying drawing, in which Figure 1 is a plan view of a ribbon of metal having a portion of its area embossed preparatory to welding. Fig. 2 is an edge view of the ribbon shown in Fig. 1. Fig. 3 is a plan view of a joint made by overlapping two ribbons of metal having embossed areas. Fig. 4 is a plan view of a lap weld made between two sheets of metal in accordance with my invention, and Fig. 5 is a greatly enlarged transverse sectional view illustrating one of the projections which are formed in the course of my process and the manner in which such projections rupture the surface scale originally present upon the metal.

The ribbon 1 shown in Figs. 1 and 2 is provided, as shown, with an embossed area 3 in which a large number of small, sharp and closely set indentations are formed, the number of such indentations being preferably some dozens or hundreds per square inch. Fig. 3 shows one manner in which two ribbons similarly embossed are placed together with their roughened areas in contact preparatory to the application of welding heat and pressure. The lap weld shown in Fig. 4 consists of two sheets of metal 4 and 5, each of which is provided with two or more embossed areas 6 so disposed as to engage one another in pairs when the edges of the sheets are overlapped.

As indicated above, it is a feature of primary importance in my process that the oxid scale, which is always present to a greater or less degree upon metal surfaces, shall be broken at many points over substantially the area to be welded in order that substantially clean contact surfaces may be exposed. The manner in which my process effects such breaking up of the surface scale is shown, greatly exaggerated, in Fig. 5. In this figure, a metal plate 7 having oxid coatings 8 on its surfaces is shown provided with an embossed projection 9. The point of the projection protrudes through the oxid scale as shown at 10 and thereby exposes a clean metallic surface.

The embossed projections may also be formed by placing the metal to be embossed in contact with a surface provided with numerous projections and subjecting the united bodies to pressure in a press or by means of a block and hammer. The particular means employed to form the projections in the metal is immaterial and may be varied according to the convenience of the operator and the apparatus or tools that he has at hand.

I am aware of the process described in the patent to Rietzel, 928,701, granted July 20, 1909, according to which spot welding is performed by forming one or more projections on the surfaces to be welded together for the purpose of localizing the electric current employed to effect the weld. My present process is clearly distinguished from the Rietzel process by reason of the form, number and function of the projections which I employ.

The Rietzel process, as disclosed in the above-cited patent and as actually practised, utilizes one or two or, at most, a few widely spaced projections in each of the articles to be welded, such projections being relatively large, while the surface scale is not substantially broken, but is merely flexed to conform to the shape of the projection. My invention, on the contrary, utilizes a very large number of exceedingly small projections over substantially the entire areas of the thin metal surfaces to be welded which are therefore almost continuously clean, while Rietzel, as stated above, employs a few projections for the sole purpose of localizing electric current.

The process described above is capable of numerous modifications which may be readily devised by persons skilled in the art to which my invention appertains without departing from its spirit and scope. It is therefore to be understood that my invention is not restricted to the precise manipulations and apparatus mentioned above, but is limited only by the scope of the appended claims.

I claim as my invention:

1. A process of preparing a thin sheet or ribbon of oxidizable metal for welding that comprises breaking the coating of oxid on the said sheet at a large number of closely adjacent points over substantially the area to be welded without substantially distorting or weakening the said sheet or ribbon.

2. A process of preparing a thin sheet or ribbon of oxidizable metal for welding that comprises forming a large number of relatively small projections over substantially the area to be welded in such a manner as to break the surface coating of oxid without substantially distorting or weakening the said sheet or ribbon.

3. A process of preparing a thin sheet or ribbon of readily oxidizable metal for welding that comprises forming a large number of relatively small indentations in one side of the said sheet and over substantially the area to be welded, and thereby producing a like number of relatively sharp projections upon its other side, to break the surface coating of oxid.

4. A process of welding a thin sheet or ribbon of metal having surface scale adhering thereto that comprises breaking the said scale at a large number of relatively small points over substantially the area to be welded, whereby clean metal surfaces are exposed at the said points, placing the said treated surface against another metal surface and applying electric current and pressure.

In testimony whereof, I have hereunto subscribed my name this 30th day of Nov. 1914.

CARL B. AUEL.

Witnesses:
 HOMER A. MULLEN,
 B. B. HINES.

Copies of this patent may be obtained for five cents each, by addressing the "Commissioner of Patents, Washington, D. C."